O. JUNGGREN.
LEAKAGE REDUCING DEVICE FOR STEAM TURBINES.
APPLICATION FILED JULY 26, 1909.

980,282.

Patented Jan. 3, 1911.

Witnesses:
Marcus L. Byng.
J. Ellis Glen.

Inventor:
Oscar Junggren,
by Allen ... Davis
Att'y.

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

LEAKAGE-REDUCING DEVICE FOR STEAM-TURBINES.

980,282.  Specification of Letters Patent.  Patented Jan. 3, 1911.

Application filed July 26, 1909. Serial No. 509,573.

*To all whom it may concern:*

Be it known that I, OSCAR JUNGGREN, a citizen of the United States, residing at Schenectady, in the county of Schenectady and State of New York, have invented certain new and useful Improvements in Leakage-Reducing Devices for Steam-Turbines, of which the following is a specification.

My invention relates to leakage reducing devices for steam turbines and has for its object to improve and simplify their construction.

Figure 1:
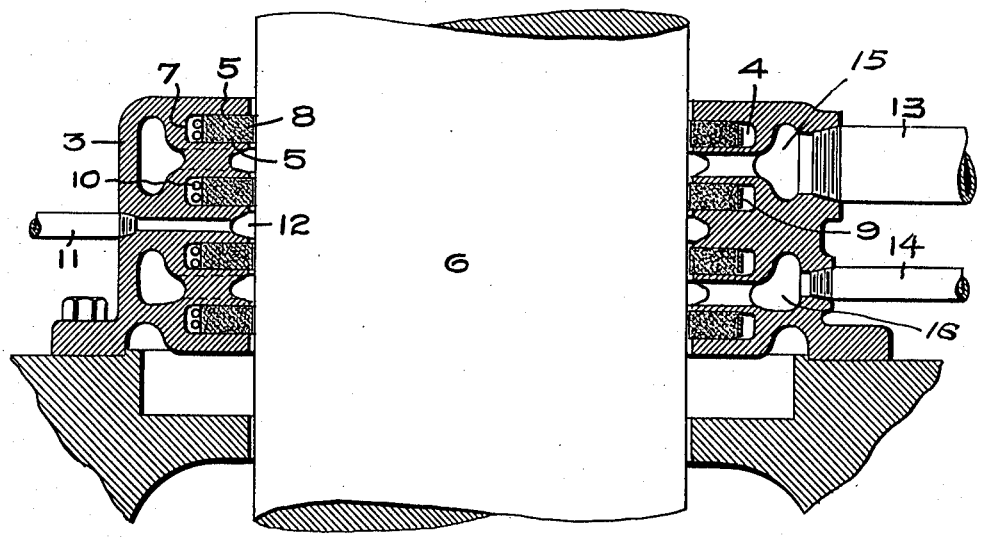
Figure 2:
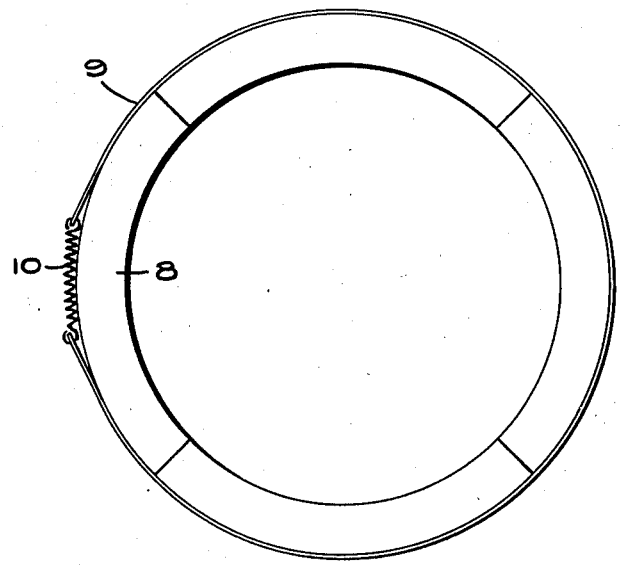

In the accompanying drawing, which is illustrative of my invention, Figure 1 is an axial section of a leakage reducing device; and Fig. 2 is a plan showing one of the carbon rings thereof.

3 indicates a casing which is made up of two or more parts. The plane of division may be axial or otherwise. The casing may be separate from the turbine or form an integral part or some portion thereof as best suits the requirements. The interior of the casing is provided with as many cells or chambers 4 as there are leakage reducing rings, four being shown in the present case. Each of these chambers is provided with two flat walls 5 that are parallel to each other and perpendicular with respect to the shaft 6. I have used the term "shaft" for the sake of simplicity and mean by it the rotating member whether it be the shaft itself or some part moving with it as a sleeve or wheel part for example. In addition each chamber is provided with an annular wall 7 which surrounds the packing ring but is separated therefrom by a large clearance.

Located in each cell or chamber is a ring 8 made up of carbon or equivalent material which takes a high polish and will not scar or injure the shaft when, for any reason, the parts seize. The ring is made up of abutting sections or segments usually three or more depending upon the diameter of the shaft. I have found butt-joints for these segments to be the most satisfactory in practice. The bore of the ring is slightly greater in diameter than the shaft so that there is always a small clearance; this clearance should, however, be as small as possible consistent with free running under normal conditions. Through this clearance a certain limited amount of steam can escape and to this extent my invention is a leakage reducing device rather than a packing which as commonly understood means a device which is intended to prevent all leakage. By making the shaft clearance exceedingly small the shaft can run free and the relatively small amount of steam lost in this manner can be taken into account in the design of the machine and will be a constant factor rather than a variable one which gradually gets worse as time goes on. This is particularly important where the leakage to be controlled takes place in an inaccessible part of the machine or where for any reason the leakage reducing devices are given scant attention.

Surrounding the carbon segments is a thin band of metal 9 whose ends are united by one or more springs 10, two in this case, to make the pressure uniform. This band also covers the joints between segments and prevents radial leakage therethrough. The band and spring serve to hold the segments together, and since the ends of said segments abut and there is a shaft clearance it follows that they are arch bound. That is to say the spring and band cannot force the segments into engagement with the shaft or rotating element. Of course if the shaft runs out of true or is moved to one side by any cause it may engage one of the segments or the adjacent ends of two of them but under no condition can the packing grip the shaft at two or more places. Each ring is arranged to make a sliding fit in its cell or chamber. This should be an easy fit but one which offers a certain limited amount of frictional resistance or opposition to movement. The total surface presented to the shaft by each segment is considerably less than the total surface presented by it to the walls of the cell or chamber. The object of this is to prevent as far as possible the tendency of the shaft to turn the packing ring within its cell.

It has been customary heretofore to anchor packing rings of the carbon type in a manner to prevent them from turning with the shaft. This is objectionable for if for any reason they grip the shaft the action will break or damage the ring and may do serious damage to the shaft. In the present case the rings are not anchored and hence are entirely free to turn if the friction created by the shaft on the wall of the bore exceeds that due to the engagement of the side faces of the packing rings with the walls of the cells. On the other hand just as soon as this happens the centrifugal force of the rotating mass causes the segments to move outwardly thereby stretching the springs when the ring will free itself from the shaft and prevent damage. The springs will then gradually bring the segments back to their original positions and the ring will be as effective as before.

I may use my improved leakage reducing device between stages, on the high pressure end of the turbine, or on the vacuum end of the turbine as desired.

If desired steam for sealing the packing may be admitted by the pipe 11 to the annular chamber 12 and drains 13 and 14 convey steam or water from the chambers 15 and 16 respectively to stages of lower pressure in the turbine or to the exhaust thereof.

It will be seen that in my improved structure all springs for pressing the rings against the side walls of the cells or of the chambers have been omitted which makes for simplicity and certainty of operation. By permitting the rings to slide freely in planes perpendicular to the shaft axis they are free to adjust themselves with respect to the shaft, and since they are not anchored against rotary motion they can, if the friction due to pressure exerted by the shaft exceeds a certain value, rotate therewith and thus free themselves automatically due to centrifugal force without damage, and that the outside springs will ultimately return them to place. The freeing of the carbon rings from the shaft in the manner specified is particularly important because said rings are relatively fragile and excessive pounding or abnormal pressure will cause them to chip or crack which impairs their effectiveness for the purpose intended.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. In a device of the character described, the combination of a shaft, a casing that surrounds the shaft and contains a chamber, a segmental arch bound ring located in said chamber whose bore is slightly greater in diameter than the shaft, the side faces of the ring frictionally engaging the opposed walls of the chamber, and means which permit the ring to free itself from the shaft when the shaft rotates said ring.

2. In a device of the character described, the combination of a shaft, a chambered casing inclosing the shaft, a segmental arch bound ring located within said chamber, both of whose side faces engage the walls of the chamber, the area of said faces being greater than the face presented to the shaft, and means which normally preserve the arch bound relation of the segments but which yield and permit the segments to rotate and at the same time move outwardly when the friction exerted by the shaft exceeds that of the walls of the casing on the ring.

3. In a device of the character described, the combination of a shaft, a casing surrounding the shaft and containing a chamber having parallel walls, a segmental arch bound ring located in the chamber and frictionally engaging both of said walls, the bore of the ring being slightly greater than the diameter of the shaft, said ring being free to rotate with the shaft, and spring means carried by the ring which normally maintains the arch bound relation of the segments but which yield outwardly when the shaft rotates the packing and permit the segments to free themselves due to the centrifugal force of their mass.

4. In a device of the character described, the combination of a casing that incloses the shaft and contains a chamber, a carbon packing ring mounted in the chamber and composed of segments whose ends form butt-joints, both of the side faces of the ring frictionally engaging the walls of the chamber, a shaft the diameter of which is slightly less than the bore of the ring, a band inclosing the ring, and spring means which unite the ends of the band and permit the segments to move away from the shaft and free themselves when the ring is rotated by the shaft.

5. In a device of the character described, the combination of a casing containing chambers, rings mounted in the chambers which are free to rotate with the shaft and to move laterally with respect thereto, a shaft which passes through the bores of the casing and rings, and means responsive to centrifugal force which permit the rings to disengage themselves from contact with the shaft.

6. In a device of the character described, the combination of a casing containing chambers, rings mounted in the chambers which are free to rotate with the shaft and to move laterally with respect thereto, a shaft which passes through the bores of the casing and rings, means responsive to centrifugal force which permit the rings to disengage themselves from contact with the shaft, and drains communicating with the chambers.

7. In a device of the character described, the combination of a shaft, a casing containing a chamber, a segmental arch bound ring surrounding the shaft and mounted in the chamber with its lateral faces in engagement with the walls thereof, the bore of the ring being slightly larger than the diameter of the shaft, said ring being free to rotate with the shaft and to move laterally with respect thereto, and yielding means acting on the periphery of the ring which tends to hold the segments thereof in arch bound relation.

In witness whereof, I have hereunto set my hand this 23rd day of July, 1909.

OSCAR JUNGGREN.

Witnesses:
 BENJAMIN B. HULL,
 HELEN ORFORD.